No. 797,015. PATENTED AUG. 15, 1905.
E. C. PARAMORE.
INDUCTION ARRESTER.
APPLICATION FILED DEC. 1, 1904.
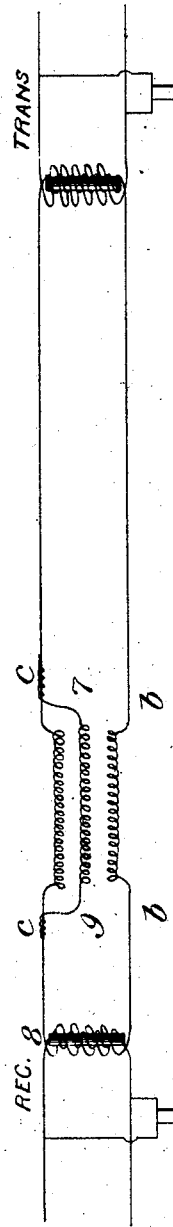
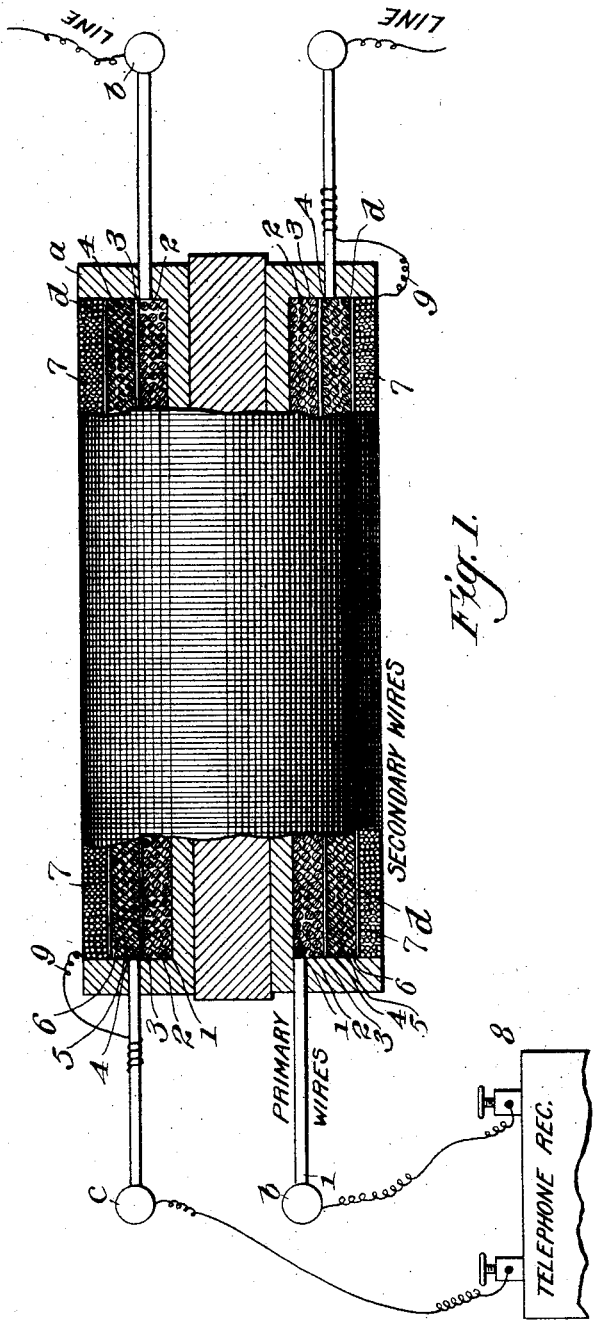

UNITED STATES PATENT OFFICE.

EDWARD C. PARAMORE, OF PHILADELPHIA, PENNSYLVANIA.

INDUCTION-ARRESTER.

No. 797,015.             Specification of Letters Patent.             Patented Aug. 15, 1905.

Application filed December 1, 1904. Serial No. 235,070.

*To all whom it may concern:*

Be it known that I, EDWARD C. PARAMORE, a citizen of the United States of America, and a resident of Germantown, in the city of Philadelphia, Pennsylvania, have invented certain new and useful Improvements in Induction-Arresters, of which the following is a specification.

My invention relates to induction arresters or neutralizers for telephone-lines; and the objects of the same are to provide simple and efficient means for counteracting or arresting interfering currents induced by lines contiguous to a telephone-line. It is a well-known fact that telephone-wires which run parallel to or within the inductive field of wires in other circuits have induced currents set up in them which cause confusing sounds in the receiver and materially interfere with the hearing of the message. I attain these objects by means of the device shown in the accompanying drawings, which form a part of this specification, and in which—

Figure 1 is a side view and partial section of an induction-coil wound and connected up in accordance with my invention. Fig. 2 is a diagrammatic view showing the relative position of the different parts of the apparatus.

In carrying out my invention I take an ordinary induction spool or bobbin $a$ and wind thereon a layer of insulated wire of, say, twenty-four gage, starting at 1 and continuing across the spool. I then continue the winding to form a second layer 2 and return the winding to form a third layer 3, and these three layers terminate in the binding-posts $b\ b$ at opposite ends and diagonally opposite positions of the spool. I then take another piece of insulated wire of the same gage and start to wind from the point 4, winding successively in the opposite direction from the windings 1, 2, and 3 the three layers 4 5 6, the ends of said layers terminating in the binding-posts $c\ c$ at opposite ends and diagonally opposite points of the spool. I then superpose upon these windings a sheet of insulating material $d$, thus completing the primary coil. I then wind upon the insulating material and in the same direction as the layers 1, 2, and 3 a number of layers 7 of fine insulated wire of, say, gage thirty-six, to form the secondary coil. This coil is formed of sufficient area or extent to counterbalance or override the resistance of the line that is equal to or greater than the resistance of the whole line, and the terminal ends of the wire are connected to the primary terminals at 9 near the binding-posts $c\ c$. Connections are made from two of the binding-posts $c\ b$ to the telephone 8 and from the other two binding-posts to the line-wires. It will be understood that the device is placed in the telephone-line intermediate the induction-coil (not shown) of the transmitter and the receiver 8, supposing a microphone-transmitter to be employed.

The operation of my invention is as follows: Lines $b$ and $c$ proceeding from the transmitter have equal induced currents set up in them by the external influences encountered. When line $b$ reaches the induction-coil, it induces equal and opposite currents in the secondary circuit, and since said secondary circuit is connected to $c$ these currents are communicated to $c$, and thereby neutralize the induced currents already existing in that line.

While I have described the primary windings as consisting of two coils of three layers each wound back and forth on the spool, it will be understood that any other number of layers may be used, dependent upon the induction to be overcome, the secondary winding always being of sufficient length to override the resistance of the line.

Having thus described my invention, what I claim is—

1. In an induction-neutralizer, two primary coils and a secondary coil wound on a single spool, and said secondary coil being in circuit with one of said primary coils, substantially as described.

2. In an induction-neutralizer, two primary coils of equal resistance, and a secondary coil of equal resistance to the line in which the neutralizer is in circuit, said secondary coil being connected at its terminals to one of the primary coils, substantially as described.

Signed at Philadelphia, Pennsylvania, this 27th day of September, 1904.

EDWARD C. PARAMORE.

Witnesses:
     HOWARD A. DARLING,
     C. M. PARAMORE.